US 11,813,526 B2

United States Patent
Kulavik et al.

(10) Patent No.: US 11,813,526 B2
(45) Date of Patent: *Nov. 14, 2023

(54) METHOD AND SYSTEM FOR DYNAMIC CONTROL OF GAME AUDIO BASED ON AUDIO ANALYSIS

(71) Applicant: Voyetra Turtle Beach, Inc., White Plains, NY (US)

(72) Inventors: Richard Kulavik, San Jose, CA (US); Shobha Kuruba, San Jose, CA (US)

(73) Assignee: Voyetra Turtle Beach, Inc., White Plains, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/856,096

(22) Filed: Jul. 1, 2022

(65) Prior Publication Data
US 2022/0331696 A1 Oct. 20, 2022

Related U.S. Application Data

(63) Continuation of application No. 17/123,500, filed on Dec. 16, 2020, now Pat. No. 11,406,897, which is a
(Continued)

(51) Int. Cl.
*H03G 3/00* (2006.01)
*A63F 13/54* (2014.01)
(Continued)

(52) U.S. Cl.
CPC .............. *A63F 13/54* (2014.09); *A63F 13/00* (2013.01); *F01D 25/12* (2013.01); *F02C 3/04* (2013.01);
(Continued)

(58) Field of Classification Search
CPC .......... A63F 13/54; A63F 13/28; A63F 13/00; G10L 19/008; H04S 3/00
(Continued)

(56) References Cited

U.S. PATENT DOCUMENTS 6,053,814 A 4/2000 Pchenitchnikov
6,614,912 B1 9/2003 Yamada et al.
(Continued)

FOREIGN PATENT DOCUMENTS

TW 391149 B * 5/2000 ............... H04S 3/00
WO 2012172480 12/2012

OTHER PUBLICATIONS

International Search Report and Written Opinion for PCT/US14/54060 dated Dec. 18, 2014.
(Continued)

*Primary Examiner* — Md S Elahee
(74) *Attorney, Agent, or Firm* — McAndrews, Held & Malloy, Ltd.

(57) ABSTRACT

A headset, during play of a particular game, receives a plurality of audio channels carrying game sounds and determines whether a first of the game sounds overwhelms a second of the game sounds. In response to the determination, the headset adjusts a level of one or more of the audio channels such that perceptibility of the second game sound is improved relative to perceptibility of the first game sound prior to the adjustment, wherein for the adjustment, a level of one or more of the audio channels carrying the first game sound is decreased while a level of one or more of the audio channels carrying the second game sound is maintained or increased. The audio channels include three or more audio channels and the adjustment of the level of the audio channels is performed while the three or more audio channels are combined into two stereo channels.

20 Claims, 12 Drawing Sheets

Related U.S. Application Data continuation of application No. 16/004,934, filed on Jun. 11, 2018, now Pat. No. 10,876,476, which is a continuation of application No. 14/753,251, filed on Jun. 29, 2015, now Pat. No. 9,993,732, which is a continuation of application No. 14/446,558, filed on Jul. 30, 2014, now Pat. No. 9,067,135.

(60) Provisional application No. 61/887,526, filed on Oct. 7, 2013.

(51) Int. Cl.
| | | |
|---|---|---|
| *A63F 13/00* | (2014.01) | |
| *F01D 25/12* | (2006.01) | |
| *F02C 3/04* | (2006.01) | |
| *F02C 7/12* | (2006.01) | |
| *F16K 1/44* | (2006.01) | |
| *F16K 31/00* | (2006.01) | |
| *G05D 23/02* | (2006.01) | |
| *G05D 23/13* | (2006.01) | |

(52) U.S. Cl.
CPC .................. *F02C 7/12* (2013.01); *F16K 1/44* (2013.01); *F16K 31/002* (2013.01); *G05D 23/02* (2013.01); *G05D 23/026* (2013.01); *G05D 23/132* (2013.01); *F05D 2260/20* (2013.01); *F05D 2270/303* (2013.01); *F05D 2300/5021* (2013.01); *Y02T 50/60* (2013.01)

(58) Field of Classification Search
USPC ........................................................ 381/104
See application file for complete search history.

(56) References Cited

U.S. PATENT DOCUMENTS

| | | |
|---|---|---|
| 7,136,712 B2 | 11/2006 | Mizumura et al. |
| 7,976,385 B2 | 7/2011 | Riggs |
| 8,979,658 B1 | 3/2015 | Kulavik |
| 9,067,135 B2 | 6/2015 | Kulavik |
| 9,993,732 B2 | 6/2018 | Kulavik et al. |
| 10,876,476 B2 | 12/2020 | Kulavik et al. |
| 2002/0094865 A1 | 7/2002 | Araki et al. |
| 2002/0161586 A1 | 10/2002 | Wang |
| 2003/0007648 A1 | 1/2003 | Currell |
| 2004/0136538 A1 | 7/2004 | Cohen et al. |
| 2005/0117761 A1 | 6/2005 | Sato |
| 2006/0120533 A1 | 6/2006 | Chen |
| 2008/0009332 A1 | 1/2008 | Kake |
| 2008/0240458 A1 | 10/2008 | Goldstein et al. |
| 2008/0318518 A1 | 12/2008 | Coutinho et al. |
| 2009/0147975 A1 | 6/2009 | Horback et al. |
| 2009/0232317 A1 | 9/2009 | Emeri et al. |
| 2009/0252337 A1 | 10/2009 | Chen et al. |
| 2009/0252355 A1 | 10/2009 | Mao |
| 2009/0304214 A1 | 12/2009 | Xiang et al. |
| 2010/0040240 A1 | 2/2010 | Bonanno |
| 2010/0153118 A1* | 6/2010 | Hotho .................. G10L 19/008 704/500 |
| 2011/0135098 A1 | 6/2011 | Kuhr et al. |
| 2012/0014553 A1 | 1/2012 | Bonanno |
| 2012/0213375 A1 | 8/2012 | Mahabub et al. |
| 2014/0050325 A1* | 2/2014 | Norris .................. G10L 19/008 381/23 |
| 2014/0073429 A1 | 3/2014 | Meneses et al. |
| 2014/0133683 A1 | 5/2014 | Robinson et al. |
| 2015/0098575 A1 | 4/2015 | Kulavik et al. |
| 2015/0098597 A1 | 4/2015 | Kulavik |
| 2015/0098603 A1 | 4/2015 | Kulavik et al. |

OTHER PUBLICATIONS

International Search Report and Written Opinion for PCT/US2014/049687 dated Nov. 18, 2014.

International Search Report and Written Opinion for PCT/US2014/059691 dated Jan. 7, 2015.

* cited by examiner

METHOD AND SYSTEM FOR DYNAMIC CONTROL OF GAME AUDIO BASED ON AUDIO ANALYSIS

CLAIM OF PRIORITY

This application is a continuation of U.S. application Ser. No. 17/123,500 filed on Dec. 16, 2020, which is a continuation of U.S. application Ser. No. 16/004,934 filed on Jun. 11, 2018, now U.S. Pat. No. 10,876,476, which is a continuation of U.S. application Ser. No. 14/753,251 filed on Jun. 29, 2015, now U.S. Pat. No. 9,993,732, which is a continuation of U.S. application Ser. No. 14/446,558 filed Jul. 30, 2014, now U.S. Pat. No. 9,067,135, and which claims the benefit of priority to U.S. provisional patent application 61/887,526 filed on Oct. 7, 2013. The aforementioned documents are hereby incorporated herein by reference in their entirety.

INCORPORATION BY REFERENCE

U.S. Pat. No. 8,879,751 titled "Gaming Headset with Programmable Audio" is hereby incorporated herein by reference in its entirety.

TECHNICAL FIELD

Aspects of the present application relate to electronic gaming. More specifically, to methods and systems for dynamic control of game audio based on audio analysis.

BACKGROUND

Limitations and disadvantages of conventional approaches to audio processing for gaming will become apparent to one of skill in the art, through comparison of such approaches with some aspects of the present method and system set forth in the remainder of this disclosure with reference to the drawings.

BRIEF SUMMARY

Methods and systems are provided for dynamic control of game audio based on audio analysis, substantially as illustrated by and/or described in connection with at least one of the figures, as set forth more completely in the claims.

DETAILED DESCRIPTION

Figure 1A:
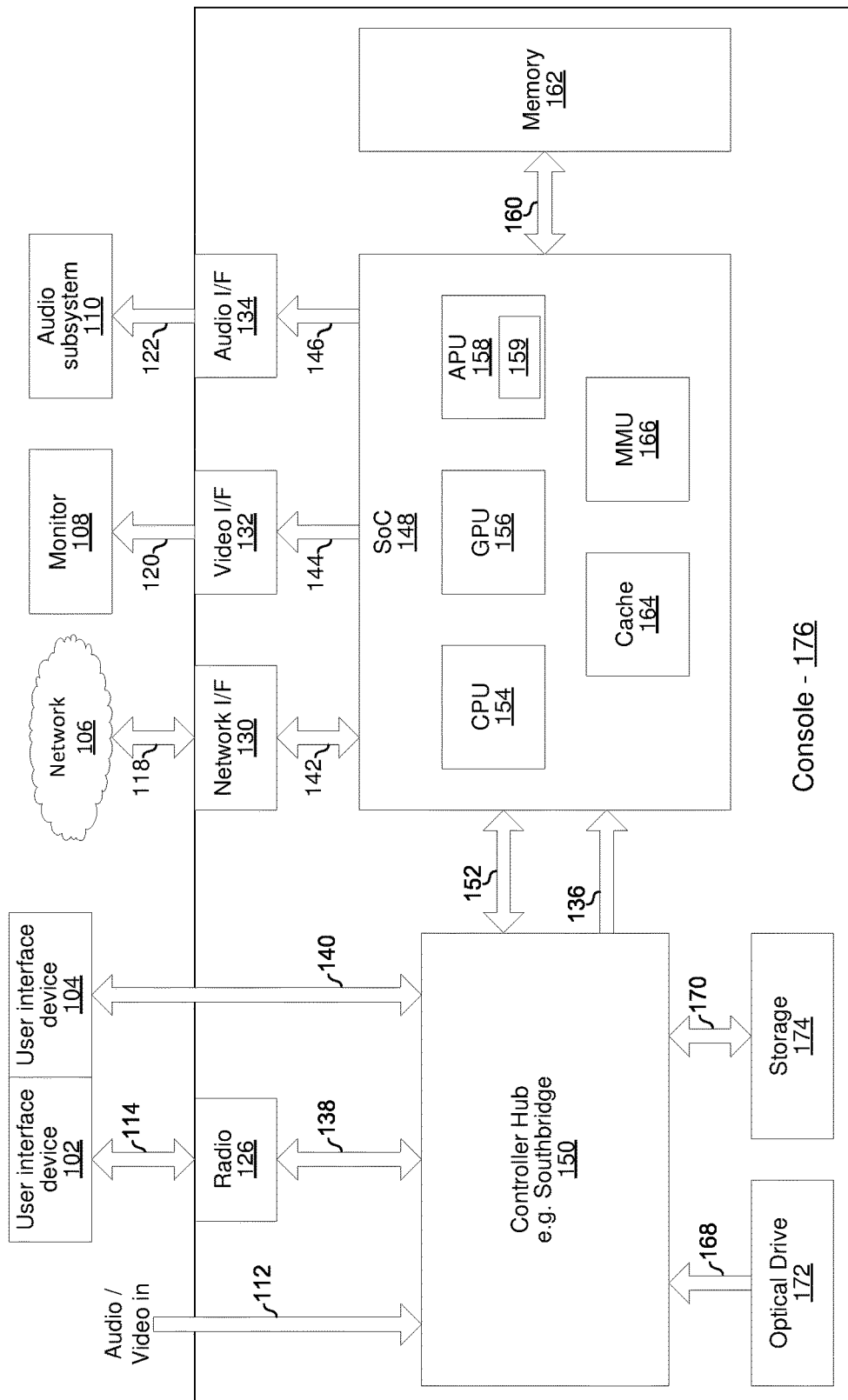
FIG. 1A is a diagram that depicts an example gaming console, which may be utilized to provide dynamic control of game audio based on audio analysis, in accordance with various exemplary embodiments of the disclosure.

Certain embodiments of the disclosure may be found in a method and system for dynamic control of game audio based on audio analysis. In accordance with various embodiments of the disclosure, a gaming device such as a gaming headset, during play of a particular game, may receive a plurality of audio channels carrying game sounds and determine whether a first of the game sounds overwhelms a second of the game sounds. In response to the determination, the gaming device may adjust a level of one or more of the audio channels such that perceptibility of the second game sound is improved relative to perceptibility of the first game sound prior to the adjustment. For the adjustment, a level of one or more of the audio channels carrying the first game sound is decreased while a level of one or more of the audio channels carrying the second game sound is maintained or increased. The audio channels include three or more audio channels and the adjustment of the level of the audio channels may be performed while the three or more audio channels are combined into two stereo channels. When the first game sound ceases to overwhelm the second game sound, the gaming device is increases the level of the one or more audio channels that carries the first game sound while the level of the one or more audio channels carrying the second game sound is maintained or decreased. The determination is done dynamically based on signal analysis of the plurality of audio channels and/or acquired audio information for the particular game. The gaming device stores the audio information for the particular game a first time the particular game is played on the gaming device. The decreasing of the level of the one or more of the audio channels may comprise muting. The gaming device unmutes the audio channel that carries the first game sound when the first game sound ceases to overwhelm the second game sound. The gaming device acquires the audio information for the particular game from a source within the gaming device and/or from a source external to the gaming device. The audio information may be acquired when the play of the particular game is started on the gaming device. The one of the plurality of audio channels that carries the first game sound may comprise a center audio channel.

Sometimes during game play, loud sounds may distract a player and this may hinder the player's game play experience rather than provide a more fulfilling game experience.

For example, sound indicative of a first player's own actions within the game may drown out or overwhelm the sound of another, second player within the game. In this regard, the first player may not adequately hear the sound of an approaching second player or the sound of the second player's vehicle approaching. In a more specific example, in a racing game, the sound of a first driver's own car engine may drown out or overwhelm the sound of a fast approaching competitor's car engine. Various embodiments of the disclosure may be operable to detect the sound of the approaching second player and the sound of the approaching competitor's car engine and mute a sound on a channel that is drowning out or overwhelming the sound of the approaching second player and the sound of the approaching competitor's car engine. In this regard, the sound indicative of a player's actions within the game may be decreased or muted so that the sound of another approaching player may be heard by the player that has a role involving loud noises. Similarly, the sound of the first driver's own car engine may be decreased or muted so that the sound of the approaching competitor's car engine may be heard by the player that has the role of the first driver.

FIG. 1A depicts an example gaming console, which may be utilized to provide dynamic control of game audio based on audio analysis, in accordance with various exemplary embodiment of the disclosure. Referring to FIG. 1, there is shown a console 176, user interface devices 102, 104, a monitor 108, an audio subsystem 110, and a network 106.

The game console 176 may comprise suitable logic, circuitry, interfaces and/or code that may be operable to present a game to, and also enable game play interaction between, one or more local players and/or one or more remote players. The game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a radio 126, network interface 130, video interface 132, audio interface 134, controller hub 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various buses/links 136, 138, 142, 144, 146, 152, 160, 168, and 170.

The controller hub 150 comprises circuitry that supports one or more data bus protocols such as High-Definition Multimedia Interface (HDMI), Universal Serial Bus (USB), Serial Advanced Technology Attachment II, III or variants thereof (SATA II, SATA III), embedded multimedia card interface (e.MMC), Peripheral Component Interconnect Express (PCIe), or the like. The controller hub 150 may also be referred to as an input/output (I/O) controller hub. Exemplary controller hubs may comprise Southbridge, Haswell, Fusion and Sandybridge. The controller hub 150 may be operable to receive audio and/or video from an external source via link 112 (e.g., HDMI), from the optical drive (e.g., Blu-Ray) 172 via link 168 (e.g., SATA II, SATA III), and/or from storage 174 (e.g., hard drive, FLASH memory, or the like) via link 170 (e.g., SATA II, III and/or e.MMC). Digital audio and/or video is output to the SoC 148 via link 136 (e.g., CEA-861-E compliant video and IEC 61937 compliant audio). The controller hub 150 exchanges data with the radio 126 via link 138 (e.g., USB), with external devices via link 140 (e.g., USB), with the storage 174 via the link 170, and with the SoC 148 via the link 152 (e.g., PCIe).

The radio 126 may comprise suitable logic, circuitry, interfaces and/or code that may be operable to communicate in accordance with one or more wireless standards such as the IEEE 802.11 family of standards, the Bluetooth family of standards, near field communication (NFC), and/or the like.

The network interface 130 may comprise suitable logic, circuitry, interfaces and/or code that may be operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise suitable logic, circuitry, interfaces and/or code that may be operable to communicate video in accordance with one or more wired or wireless video transmission standards. For example, the video interface 132 may receive CEA-861-E compliant video data via link 144 and encapsulate/format, etc., the video data in accordance with an HDMI standard for output to the monitor 108 via an HDMI link 120.

The audio interface 134 may comprise suitable logic, circuitry, interfaces and/or code that may be operable to communicate audio in accordance with one or more wired or wireless audio transmission standards. For example, the audio interface 134 may receive CEA-861-E compliant audio data via the link 146 and encapsulate/format, etc. the video data in accordance with an HDMI standard for output to the audio subsystem 110 via an HDMI link 122.

The central processing unit (CPU) 154 may comprise suitable logic, circuitry, interfaces and/or code that may be operable to execute instructions for controlling/coordinating the overall operation of the game console 176. Such instructions may be part of an operating system of the console and/or part of one or more software applications running on the console.

The graphics processing unit (GPU) 156 may comprise suitable logic, circuitry, interfaces and/or code that may be operable to perform graphics processing functions such as compression, decompression, encoding, decoding, 3D rendering, and/or the like.

The audio processing unit (APU) 158 may comprise suitable logic, circuitry, interfaces and/or code that may be operable to perform audio processing functions such as volume/gain control, compression, decompression, encoding, decoding, surround-sound processing, and/or the like to output single channel or multi-channel (e.g., 2 channels for stereo or 6, 8, or more channels for surround sound) audio. The APU 158 comprises memory (e.g., volatile and/or non-volatile memory) 159 which stores parameter settings to affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console and/or via an application programming interface (API) provided by the console 176.

The cache memory 164 may comprise suitable logic, circuitry, interfaces and/or code that may provide high-speed memory functions for use by the CPU 154, GPU 156, and/or APU 158. The cache memory 164 may typically comprise DRAM or variants thereof. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to the user interface device 102, the user interface device 104, the network 106, the monitor 108, and the audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, NFC and/or the like). The user interface device 102 may be operable to communicate with the game console 176 via the wired link 140 (e.g., USB or the like).

The network 106 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuitry. The game console 176 sends audio to the audio subsystem 110 via link(s) 122 (e.g., S/PDIF for digital audio or "line out" for analog audio). Additional details of an example audio subsystem 110 are described below.

Figure 1B:
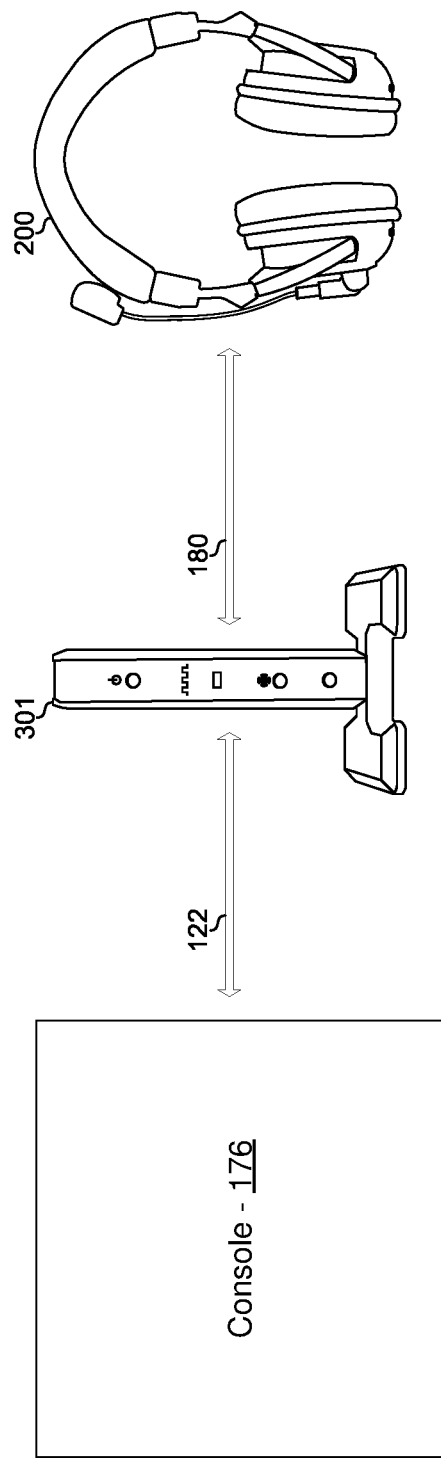
FIG. 1B is a diagram that depicts an example gaming audio subsystem comprising a headset and an audio basestation, in accordance with various exemplary embodiments of the disclosure.

FIG. 1B is a diagram that depicts an example gaming audio subsystem comprising a headset and an audio basestation, in accordance with various exemplary embodiments of the disclosure. Referring to FIG. 1B, there is shown a console 176, a headset 200 and an audio basestation 301. The headset 200 communicates with the basestation 301 via a link 180 and the basestation 301 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C. The basestation 301 may be as described below with reference to FIGS. 3A-3B.

Figure 1C:
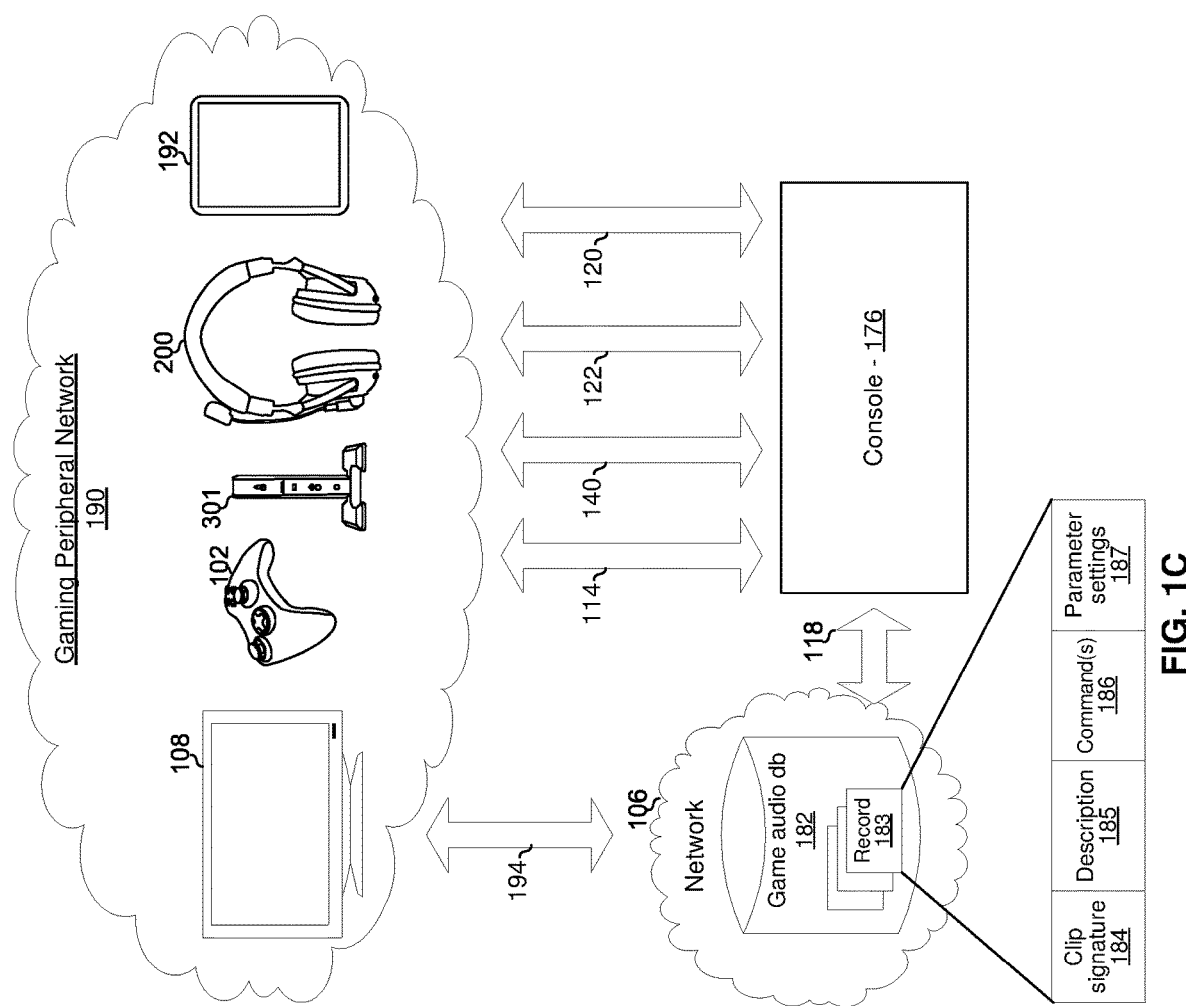
FIG. 1C is a diagram of an exemplary gaming console and an associated network of peripheral devices, in accordance with various exemplary embodiments of the disclosure.

FIG. 1C is a diagram of an exemplary gaming console and an associated network of peripheral devices, in accordance with various exemplary embodiments of the disclosure. Referring to FIG. 1C, there is shown is the console 176, which is communicatively coupled to a plurality of peripheral devices and a network 106. The example peripheral devices shown include a monitor 108, a user interface device 102, a headset 200, an audio basestation 301, and a multi-purpose device 192.

The monitor 108 and the user interface device 102 are as described above. The headset 200 is as described below with reference to FIGS. 2A-2C. The audio basestation is as described below with reference to, for example, FIGS. 3A-3B.

The multi-purpose device 192 may comprise, for example, a tablet computer, a smartphone, a laptop computer, or the like and that runs an operating system such as Android, Linux, Windows, iOS, OSX, or the like. An example multi-purpose device is described below with reference to FIG. 4. Hardware (e.g., a network adaptor) and software (i.e., the operating system and one or more applications loaded onto the device 192) may configure the device 192 for operating as part of the GPN 190. For example, an application running on the device 192 may cause display of a graphical user interface (GUI), which may enable a user to access gaming-related data, commands, functions, parameter settings, and so on. The graphical user interface may enable a user to interact with the console 176 and the other devices of the GPN 190 to enhance the user's gaming experience.

The peripheral devices 102, 108, 192, 200, 300 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 301 in a single hop (e.g., over a proprietary RF link) and with the device 192 in a single hop (e.g., over a Bluetooth or Wi-Fi direct link), while the tablet may communicate with the basestation 301 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links and/or hops among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures (or "acoustic fingerprints") of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 185 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190.

Figure 2A:
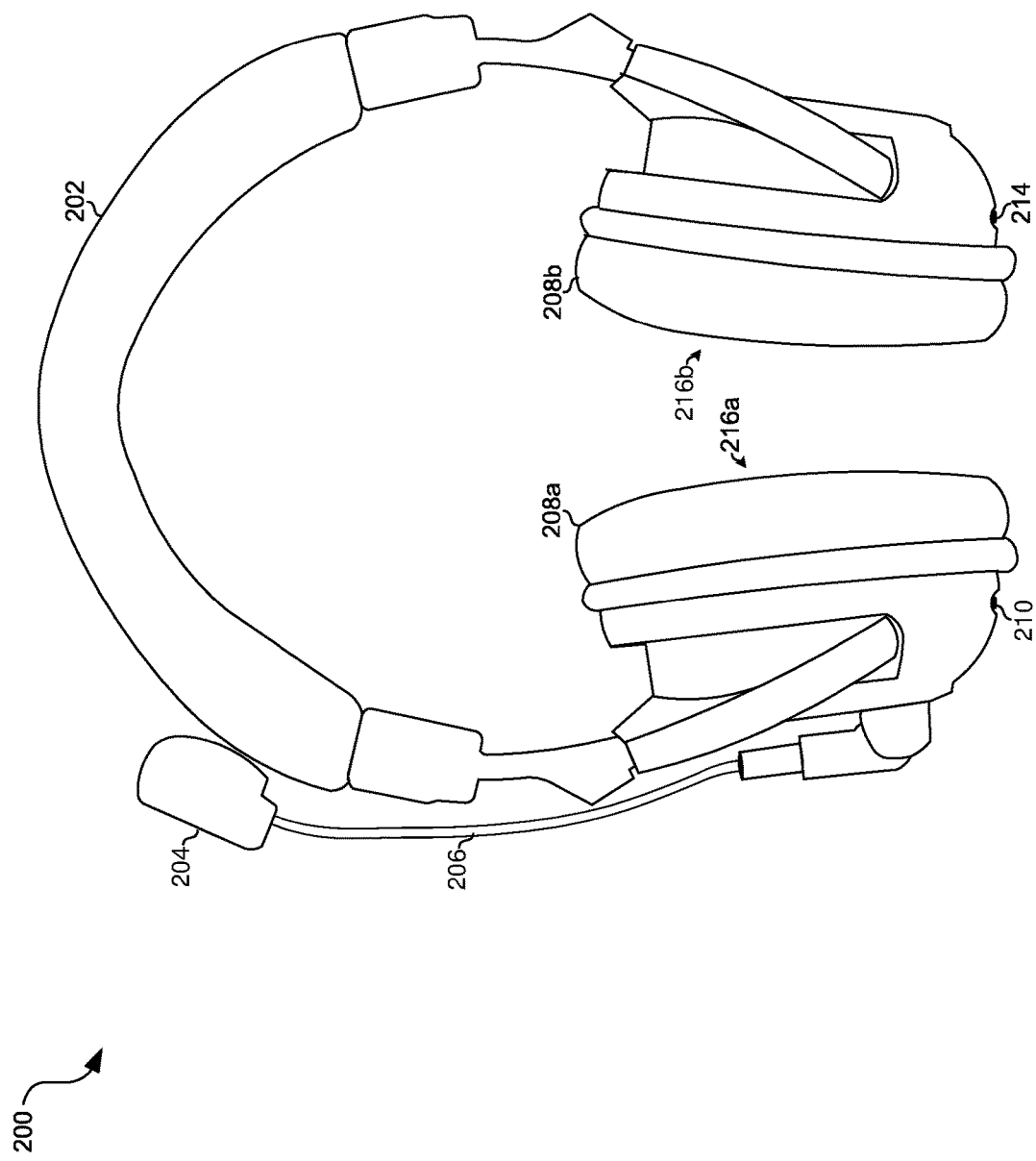
FIGS. 2A and 2B are diagrams that depict two views of an example embodiment of a gaming headset, in accordance with various exemplary embodiments of the disclosure.
Figure 2B:
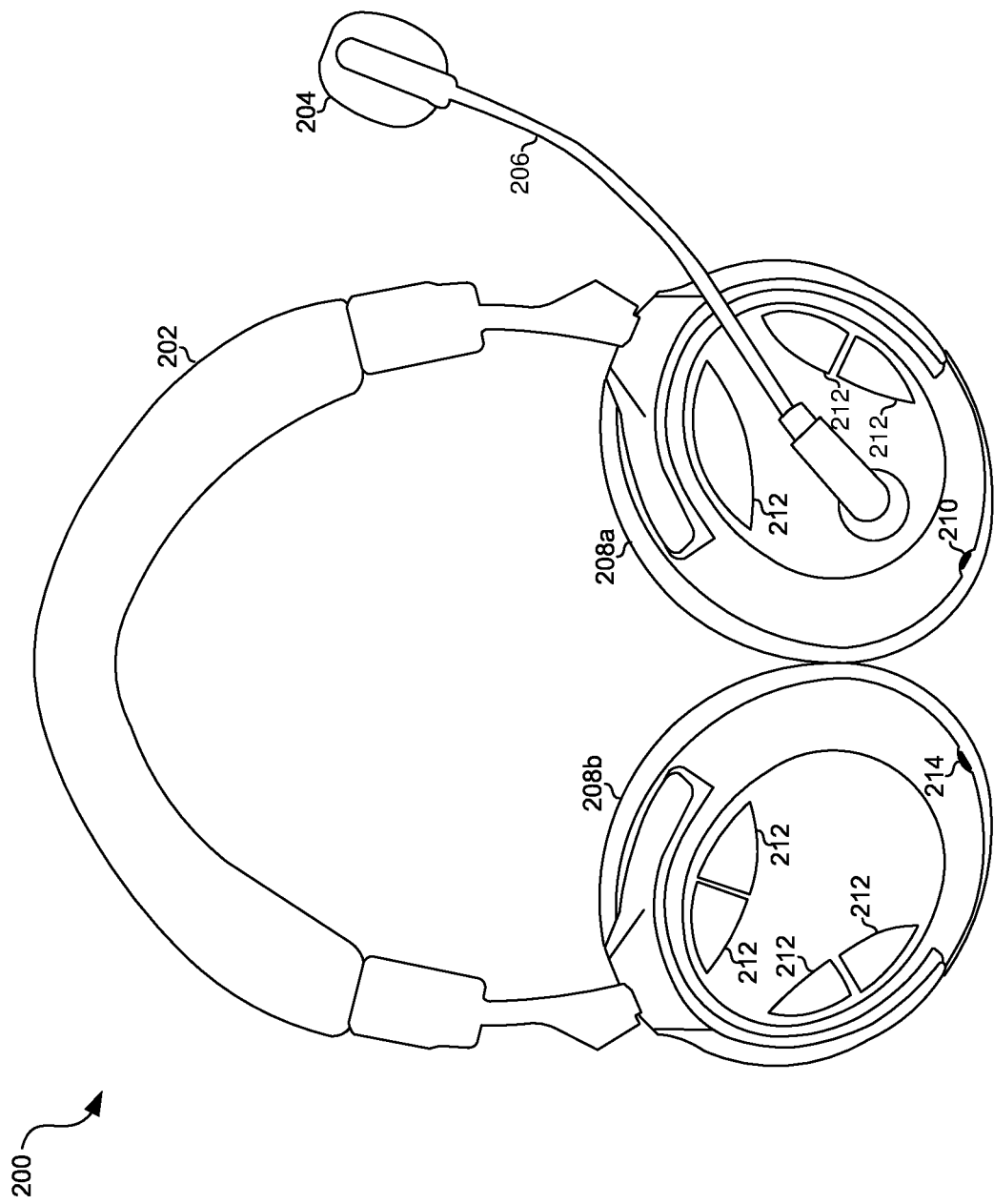

FIGS. 2A and 2B are diagrams that depict two views of an example embodiment of a gaming headset, in accordance with various exemplary embodiments of the disclosure. Referring to FIGS. 2A and 2B, there are shown two views of an example headset 200 that may present audio output by a gaming console such as the console 176. The headset 200 comprises a headband 202, a microphone boom 206 with microphone 204, ear cups 208a and 208b which surround speakers 216a and 216b, connector 210, connector 214, and user controls 212.

The connector 210 may be, for example, a 3.5 mm headphone socket for receiving analog audio signals (e.g., receiving chat audio via an Xbox "talkback" cable).

The microphone 204 may comprise suitable logic, circuitry, interfaces and/or code that may be operable to convert acoustic waves (e.g., the voice of the person wearing the headset) to electric signals for processing by circuitry of the headset and/or for output to a device (e.g., console 176, basestation 301, a smartphone, and/or the like) that is in communication with the headset.

The speakers 216a and 216b may comprise circuitry that may be operable to convert electrical signals to sound waves.

The user controls 212 may comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, NFC, or the like) with another computing device, and/or the like. Some of the user controls 212 may adaptively and/or dynamically change during game play based on a particular game that is being played. Some of the user controls 212 may also adaptively and/or dynamically change during game play based on a particular player that is engage in the game play. The connector 214 may be, for example, a USB, thunderbolt, Firewire or other type of port or interface. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

Figure 2C:
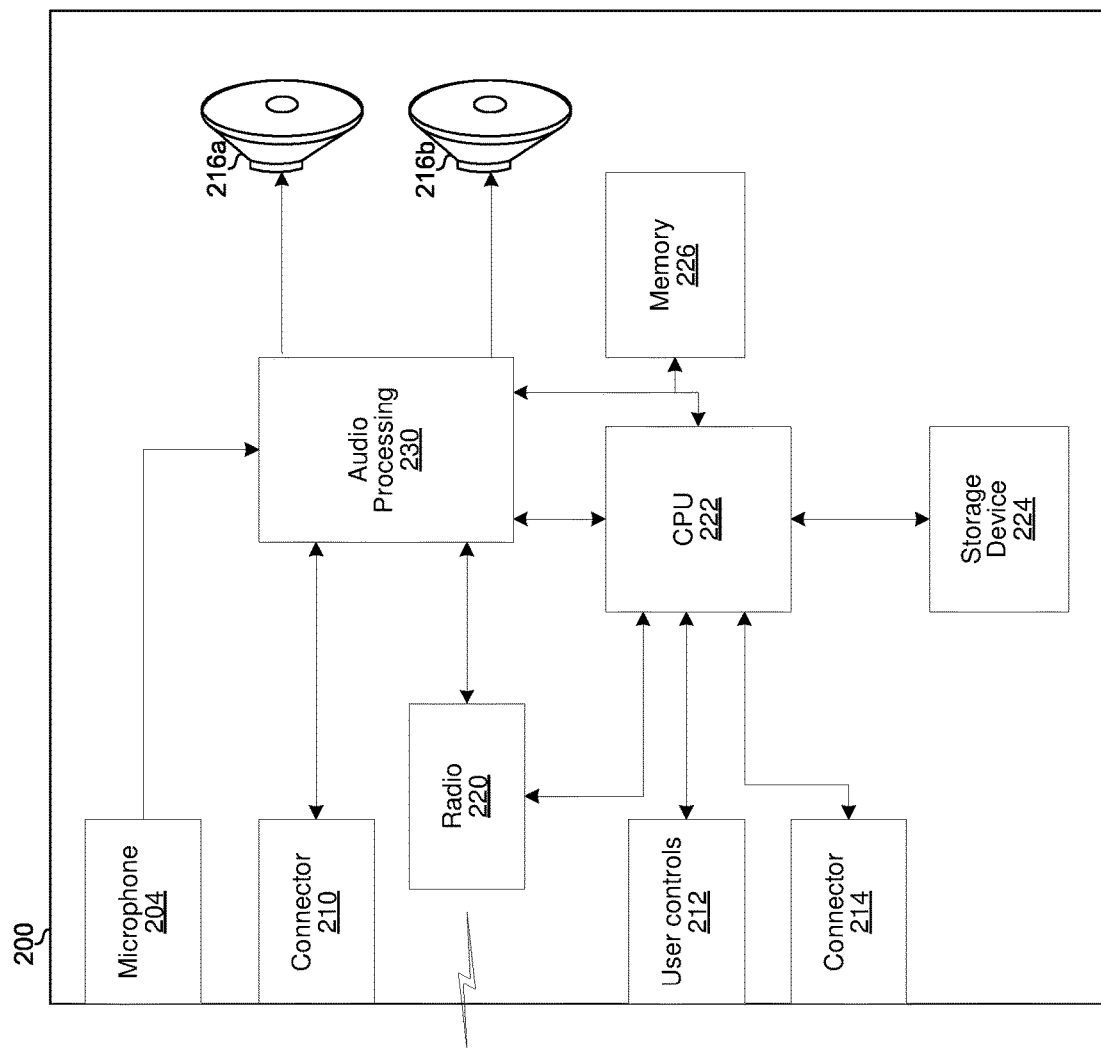
FIG. 2C is a diagram that depicts a block diagram of the example headset of FIGS. 2A and 2B, in accordance with various exemplary embodiments of the disclosure.

FIG. 2C is a diagram that depicts a block diagram of the example headset of FIGS. 2A and 2B, in accordance with various exemplary embodiments of the disclosure. Referring to FIG. 2C, there is shown a headset 200. In addition to the connector 210, user controls 212, connector 214, microphone 204, and speakers 216a and 216b already discussed, shown are a radio 220, a CPU 222, a storage device 224, a memory 226, and an audio processing circuit 230.

The radio 220 may comprise suitable logic, circuitry, interfaces and/or code that may be operable to communicate in accordance with one or more standardized (such as, for example, the IEEE 802.11 family of standards, NFC, the Bluetooth family of standards, and/or the like) and/or proprietary wireless protocol(s) (e.g., a proprietary protocol for receiving audio from an audio basestation such as the basestation 301).

The CPU 222 may comprise suitable logic, circuitry, interfaces and/or code that may be operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The CPU 222 may also be operable to handle dynamic control of game audio based on audio analysis of a plurality of audio channels. In this regard, the CPU 222 may be operable to dynamically handle the increasing and decreasing of the level of an audio signal on an audio channel. Decreasing of the level of the audio may include muting. Increasing the level of the audio may include unmuting. The increasing and/or decreasing of the level of the audio may be based on audio information, which may be stored in the storage device 224 and/or the memory 226.

The storage device 224 may comprise suitable logic, circuitry, interfaces and/or code that may comprise, for example, FLASH or other nonvolatile memory, which may be operable to store data comprising operating data, configuration data, settings, and so on, which may be used by the CPU 222 and/or the audio processing circuit 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuit 230. As another example, one or more parameter settings may determine, at least in part, a frequency response of one or more filters that operate on audio signals in the audio processing circuit 230. As another example, one or more parameter settings may determine, at least in part, whether and which sound effects are added to audio signals in the audio processing circuit 230 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214.

The storage device 224 may also be operable to store audio information corresponding to a plurality of audio channels for a game play. In one embodiment of the disclosure, the headset 200 may be operable to download the audio information for a particular game from a server and store the downloaded audio information in the storage device 224. In this regard, the CPU 222 may be operable to configure the radio 220 to download the audio information for a particular game.

In another embodiment of the disclosure, the CPU 222 may be operable to configure the audio processing circuit 230 to perform signal analysis on the plurality of audio channels that are received via the connector 210 and/or the radio 220. The plurality of audio channels may comprise, for example, six channels (center, front right, right, left, front left, and subwoofer) or eight channels (center, front right, right, back right, back left, left, front left, and subwoofer). The CPU 222 may be operable to control the operation of the audio processing circuit 230 in order to store the results of the audio analysis along with an identifier of the game in the storage device 224. The audio analysis may be executed the first time that the game is played using the headset 200.

The memory 226 may comprise suitable logic, circuitry, interfaces and/or code that may comprise volatile memory used by the CPU 222 and/or audio processing circuit 230 as program memory, for storing runtime data, etc. In this regard, the memory 226 may comprise information and/or data that may be utilized to control operation of the audio processing circuit 230 to perform signal analysis on the plurality of received audio channels.

The audio processing circuit 230 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing performed by the audio processing circuit 230 may also be determined based on default settings, player preference, and/or by adaptive and/or dynamic changes to the game play environment. The processing may be performed on game, chat, and/or microphone audio that is subsequently output to speaker 216*a* and 216*b*. Additionally, or alternatively, the processing may be performed on chat audio that is subsequently output to the connector 210 and/or radio 220.

The audio processing circuit 230 may be operable to perform signal analysis on the plurality of received audio channels. In this regard, the audio processing circuit 230 may be operable to analyze the audio levels on each of the plurality of received audio channels in order to determine when a first game sound (e.g., the player's own engine in a racing game or the player's own actions in a first-person adventure game) on a first one or more audio channel(s) drowns out or overwhelms a second game sound (e.g., the engine of another car trying to pass the player in a racing game, or the footsteps of someone approaching from behind the player in a first-person adventure game) on a second one or more audio channels. Based on the analysis, the audio processing circuit 230 may be operable to decrease level(s) of the first audio channel(s) while maintaining, or increasing, level(s) of the second audio channel(s) so that the second game sound on the second audio channel(s) is prominent and may be adequately heard by a player of the game. That is, the adjusting of the audio levels may improve perceptibility of the second game sound relative to if the audio levels had not been adjusted. After the level(s) of the first audio channel(s) has been decreased, the audio processing circuit 230 may continue to analyze the audio channels and may determine when the first game sound on the first audio channel(s) no longer drowns out or overwhelms the second game sound on the second audio channel(s). Upon such a determination, the audio processing system 230 may increase level(s) of the first audio channel(s) while maintaining or decreasing level(s) of the second audio channel(s). In some embodiments of the disclosure, the first audio channel may comprise a center channel. Notwithstanding, the disclosure is not limited in this regard. Accordingly, in other embodiments of the disclosure, the first channel(s) may be channels other than the center channel (e.g., front left, center, and/or front right).

In accordance with an embodiment of the disclosure, if the audio processing circuit 230 determines that the level of the first game sound on the first audio channel(s) exceeds the level of the second game sound on the second audio channel by a particular threshold value, the audio processing circuit 230 may be operable to mute one or more of the first audio channels. The audio processing circuit 230 may continue to analyze the audio channels in order to determine when the level of the first game sound on the first audio channel(s) falls below the particular threshold value. In this regard, when the level of the first game sound on the first audio channel(s) falls below the particular threshold amount above the level of the second game sound, the one or more of the first audio channels may be unmuted.

In some instances there may be some overlap as to which channel(s) the first game sound is on and which channel(s) the second game sound is on, in such an instance, levels of the channel(s) on which the first game sound is more intense than the second game sound may be decreased while levels of the channel(s) on which the second game sound is more intense than the first game sound may be maintained or increased.

The audio processing circuit 230 may be operable to decrease and/or increase the level of the first audio channel(s) dynamically (i.e., during game play) based on the signal analysis. For example, the audio processing circuit 230 may be operable to mute and/or unmute the first audio channel(s) dynamically based on the signal analysis.

In an exemplary embodiment of the disclosure, the CPU 222 may be operable to acquire stored audio information for a particular game from the storage device 224. In this regard, the CPU 222 may detect or determine the identity of the game and may acquire or load the corresponding stored audio information for the detected or determined game from the storage device 224. In some embodiments of the disclosure, at least a portion of the audio information for a particular game may be stored in the memory 226. Once the CPU 222 loads the audio information for the game, the headset 200 may not need to perform signal analysis on the plurality of audio channels. Rather, the CPU 222 may be operable to handle decreasing and/or increasing of the level of the first audio channel based on the acquired or loaded stored audio information. Similarly, the CPU 222 may also be operable to handle muting and/or unmuting of the first audio channel based on the acquired or loaded stored audio information. The CPU 222 may be operable to dynamically handle the increasing and decreasing of the audio channel, and the muting and/or unmuting of the first audio channel based on the acquired or loaded stored audio information. The audio information may comprise, for example, acoustic fingerprints, information for determining relative audio levels that correspond to one sound overwhelming the other, and/or other information such as may be stored in a record 183 of the database 182 described above.

Figure 3A:
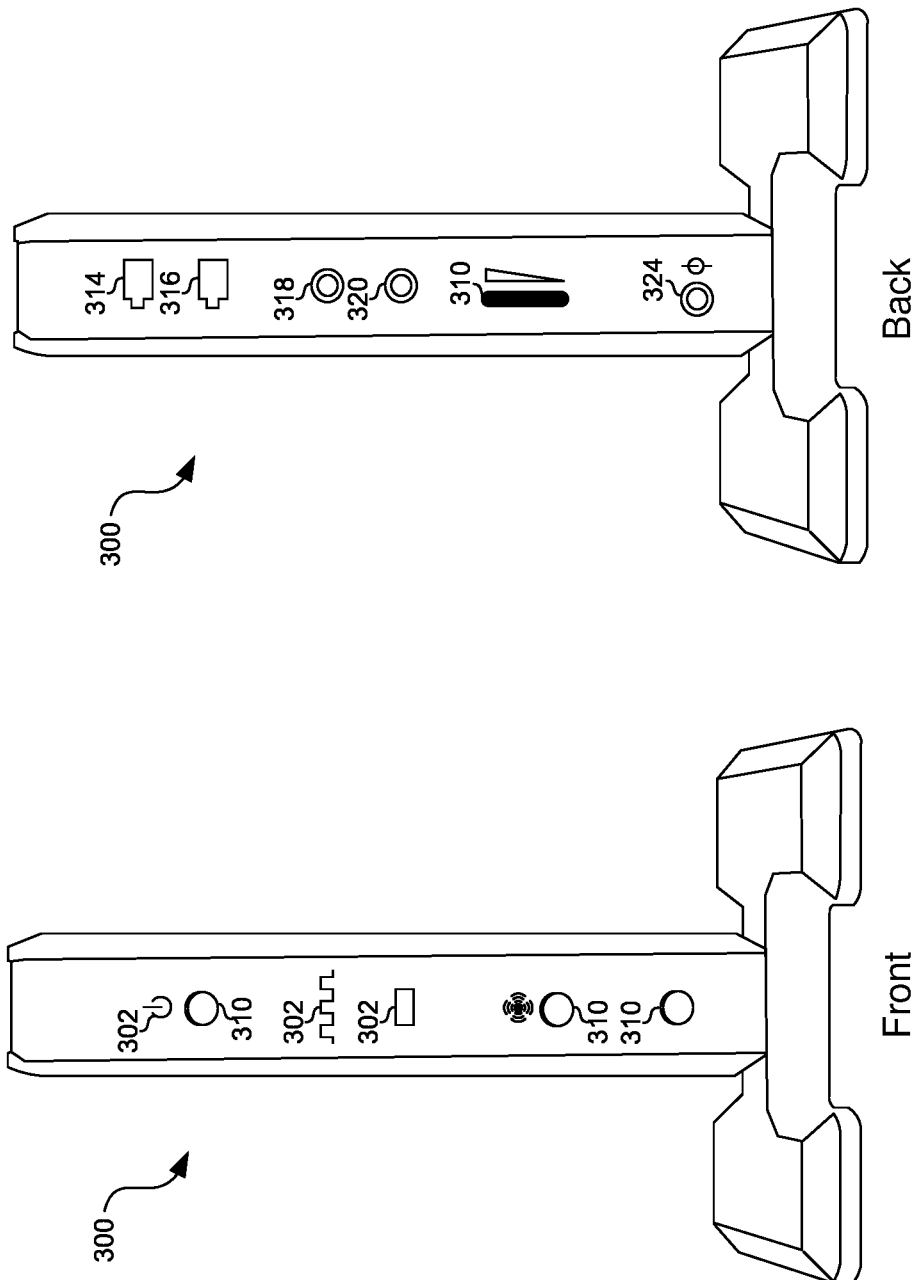
FIG. 3A is a diagram that depicts two views of an example embodiment of an audio basestation, in accordance with various exemplary embodiments of the disclosure.

FIG. 3A is a diagram that depicts two views of an example embodiment of an audio basestation, in accordance with various exemplary embodiments of the disclosure. Referring to FIG. 3A, there is shown an exemplary embodiment of an audio basestation 301. The basestation 301 comprises status indicators 302, user controls 310, power port 324, and audio connectors 314, 316, 318, and 320.

The audio connectors 314 and 316 may comprise digital audio in and digital audio out (e.g., S/PDIF) connectors, respectively. The audio connectors 318 and 320 may comprise a left "line in" and a right "line in" connector, respectively. The controls 310 may comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 318 and 320. The status indicators 302 may indicate, for example, whether the audio basestation 301 is powered on, whether audio data is being received by the basestation 301 via connectors 314, and/or what type of audio data (e.g., Dolby Digital) is being received by the basestation 301.

Figure 3B:
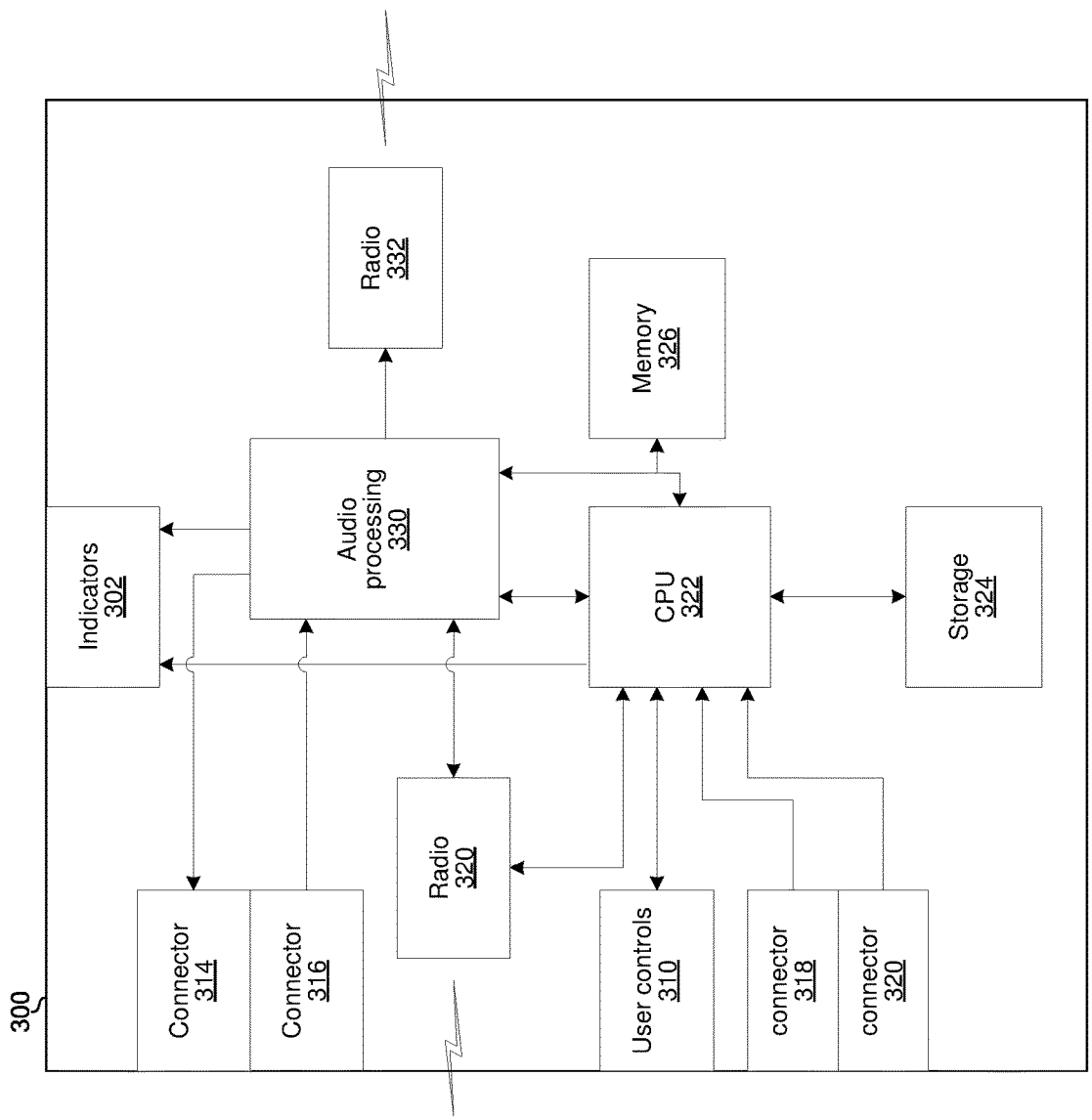
FIG. 3B is a diagram that depicts a block diagram of the audio basestation, in accordance with various exemplary embodiments of the disclosure.

FIG. 3B is a diagram that depicts a block diagram of the audio basestation 301, in accordance with various exemplary embodiments of the disclosure. Referring to FIG. 3B, there is shown an exemplary embodiment of an audio basestation 301. In addition to the user controls 310, indicators 302, and connectors 314, 316, 318, and 320 described above, the block diagram additionally shows a CPU 322, a storage device 324, a memory 326, a radio 320, an audio processing circuit 330, and a radio 332.

The radio 320 comprises suitable logic, circuitry, interfaces and/or code that may be operable to communicate in accordance with one or more standardized (such as the IEEE 802.11 family of standards, the Bluetooth family of standards, NFC, and/or the like) and/or proprietary (e.g., proprietary protocol for receiving audio protocols for receiving audio from a console such as the console 176) wireless protocols.

The radio 332 comprises suitable logic, circuitry, interfaces and/or code that may be operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to the headphones 200).

The CPU 322 comprises suitable logic, circuitry, interfaces and/or code that may be operable to execute instructions for controlling/coordinating the overall operation of the audio basestation 301. Such instructions may be part of an operating system or state machine of the audio basestation 301 and/or part of one or more software applications running on the audio basestation 301. In some implementations, the CPU 322 may be, for example, a programmable interrupt controller, a state machine, or the like.

The storage 324 may comprise, for example, FLASH or other nonvolatile memory for storing data which may be used by the CPU 322 and/or the audio processing circuit 330. Such data may include, for example, parameter settings that affect processing of audio signals in the basestation 301. For example, one or more parameter settings may determine, at least in part, a gain of one or more gain elements of the audio processing circuit 330. As another example, one or more parameter settings may determine, at least in part, a frequency response of one or more filters that operate on audio signals in the audio processing circuit 330. As another example, one or more parameter settings may determine, at least in part, whether and which sound effects are added to audio signals in the audio processing circuit 330 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the basestation 301 in accordance with one or more algorithms, based on user input (e.g., via controls 310), and/or based on input received via one or more of the connectors 314, 316, 318, and 320.

The memory 326 may comprise volatile memory used by the CPU 322 and/or audio processing circuit 330 as program memory, for storing runtime data, etc.

The audio processing circuit 330 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 301. Additionally, or alternatively, the processing may be performed on a microphone audio signal that is subsequently output to a device (e.g., console 176) in communication with the basestation 301.

Figure 4:
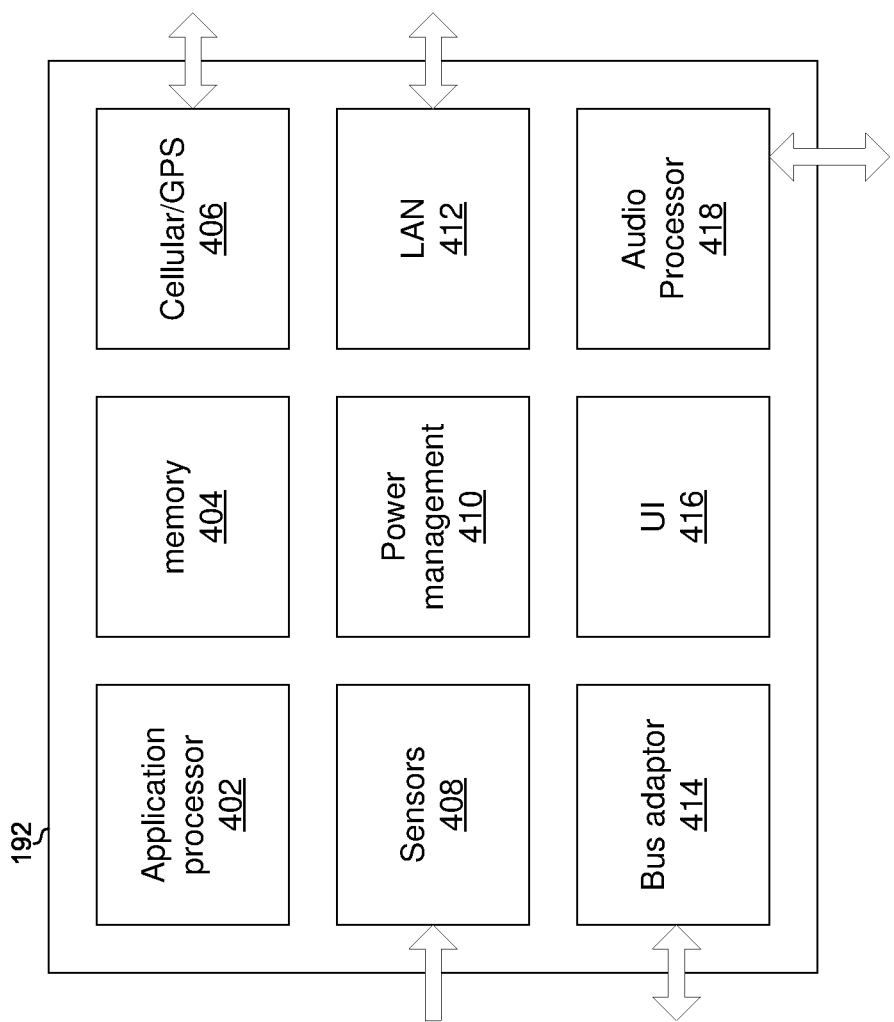
FIG. 4 is a block diagram of an exemplary multi-purpose device, in accordance with various exemplary embodiments of the disclosure.

FIG. 4 is a block diagram of an exemplary multi-purpose device 192, in accordance with various exemplary embodiments of the disclosure. The example multi-purpose device 192 comprises an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises suitable logic, circuitry, interfaces and/or code that may be operable to execute instructions for controlling/coordinating the overall operation of the multi-purpose device 192 as well as graphics processing functions of the multi-purpose device 1922. Such instructions may be part of an operating system of the console and/or part of one or more software applications running on the console.

The memory subsystem 404 comprises volatile memory for storing runtime data, nonvolatile memory for mass storage and long-term storage, and/or a memory controller which controls reads/writes to memory.

The cellular/GPS networking subsystem 406 comprises suitable logic, circuitry, interfaces and/or code that may be operable to perform baseband processing and analog/RF processing for transmission and reception of cellular and GPS signals.

The sensors 408 comprise, for example, a camera, a gyroscope, an accelerometer, a biometric sensor, and/or the like.

The power management subsystem 410 comprises suitable logic, circuitry, interfaces and/or code that may be operable to manage distribution of power among the various components of the multi-purpose device 192.

The LAN subsystem 412 comprises suitable logic, circuitry, interfaces and/or code that may be operable to perform baseband processing and analog/RF processing for transmission and reception of cellular and GPS signals.

The bus adaptor 414 comprises suitable logic, circuitry, interfaces and/or code that may be operable for interfacing one or more internal data busses of the multi-purpose device with an external bus (e.g., a Universal Serial Bus) for transferring data to/from the multi-purpose device via a wired connection.

The user interface subsystem 416 comprises suitable logic, circuitry, interfaces and/or code that may be operable to control and relay signals to/from a touchscreen, hard buttons, and/or other input devices of the multi-purpose device 192.

The audio processor 418 comprises suitable logic, circuitry, interfaces and/or code that may be operable to process (e.g., digital-to-analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5:
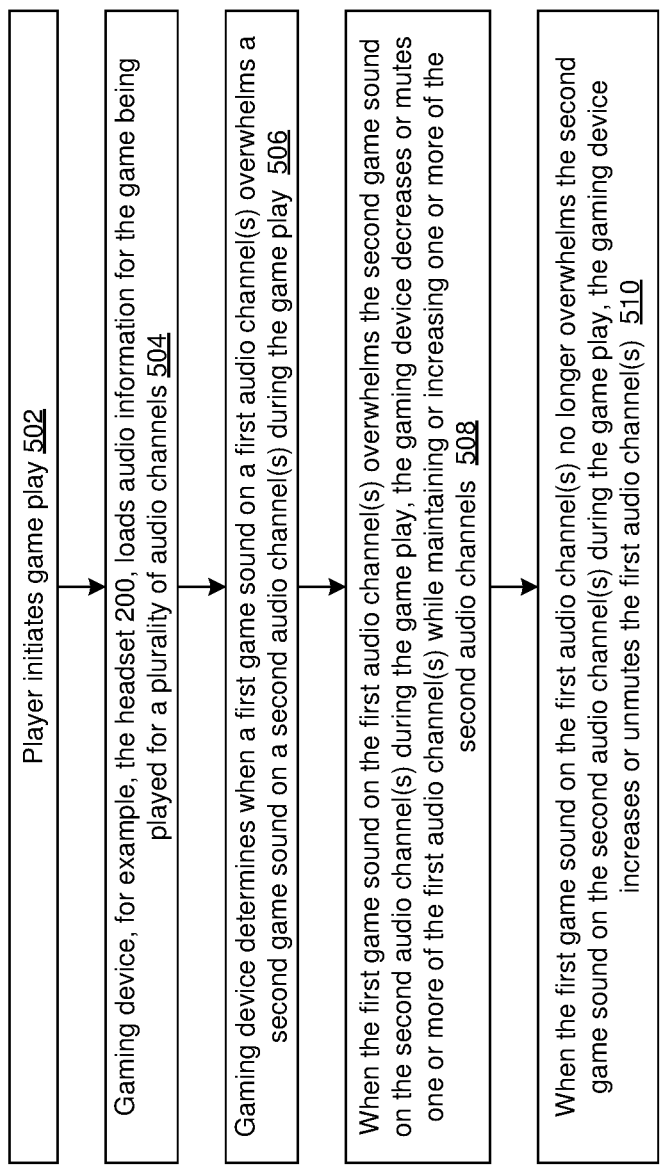
FIG. 5 is a flow diagram illustrating exemplary steps for providing dynamic control of game audio based on audio analysis, in accordance with various exemplary embodiments of the disclosure.

FIG. 5 is a flow diagram illustrating exemplary steps for providing dynamic control of game audio based on audio analysis, in accordance with various exemplary embodiments of the disclosure. Referring to FIG. 5, there is shown a flow chart 500 comprising a plurality of exemplary steps, namely, 502 through 510. In step 502, a player initiates game play. In step 504, the gaming device, for example, the headset 200, loads audio information for the game for a plurality of audio channels. In step 506, the gaming device determines when a first game sound on a first audio channel(s) overwhelms a second game sound on a second audio channel(s) during the game play. In step 508, when the first game sound on the first audio channel(s) overwhelms the second game sound on the second audio channel(s) during the game play, the gaming device decreases or mutes one or more of the first audio channels while maintaining or increasing one or more of the second audio channels. In step 510, when the first game sound on the first audio channel(s) no longer overwhelms the second game sound on the second audio channel(s) during the game play, the gaming device increases or unmutes the first audio channel(s).

Figure 6:
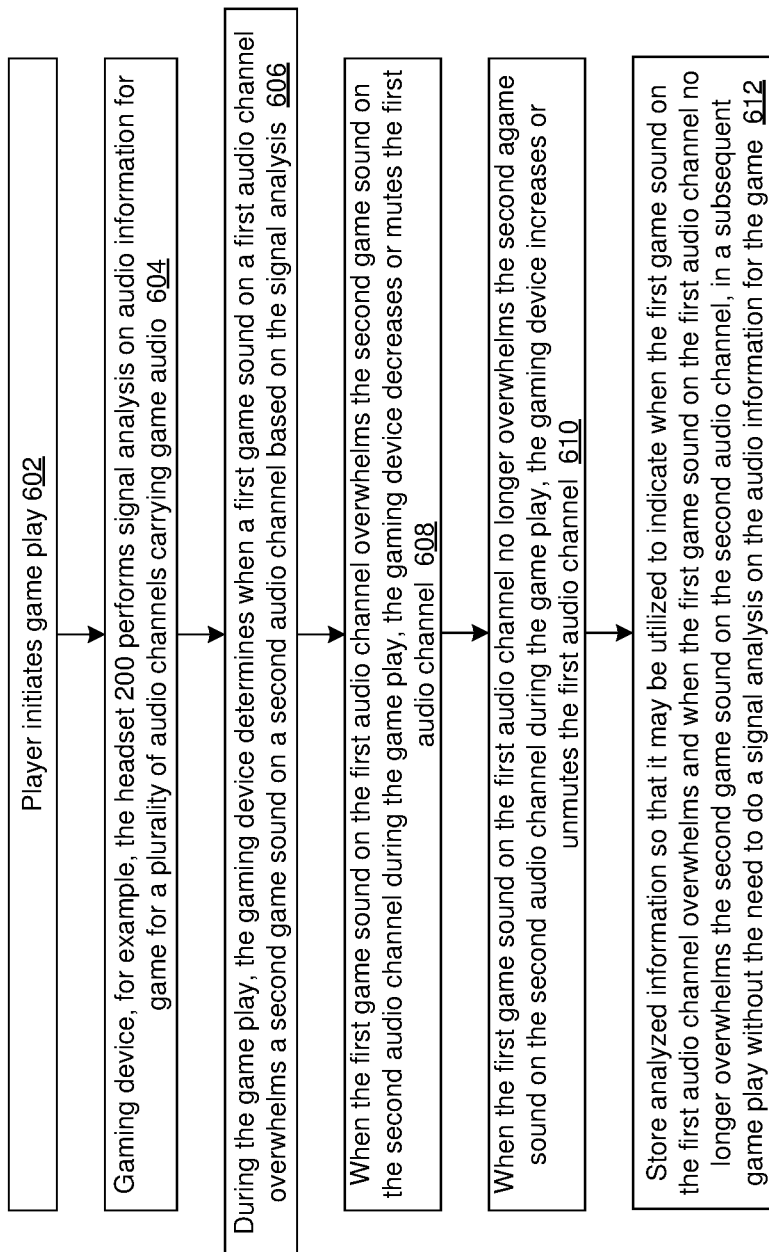
FIG. 6 is a flow diagram illustrating exemplary steps for providing dynamic control of game audio based on audio analysis, in accordance with various exemplary embodiments of the disclosure.

FIG. 6 is a flow diagram illustrating exemplary steps for providing dynamic control of game audio based on audio analysis, in accordance with various exemplary embodiments of the disclosure. Referring to FIG. 6, there is shown a flow chart 600 comprising a plurality of exemplary steps, namely, 602 through 612. In step 602, a player initiates game play. In step 604, the gaming device performs signal analysis on audio information for the game for a plurality of audio channels carrying game audio. In step 606, during the game play, the gaming device determines when a first game sound on a first audio channel overwhelms a second game sound on a second audio channel, based on the signal analysis. In step 608, when the first game sound on the first audio channel overwhelms the second game sound on the second audio channel during the game play, the gaming device decreases or mutes the first audio channel. In step 610, when the first game sound on the first audio channel no longer overwhelms the second game sound on the second audio channel during the game play, the gaming device increases or unmutes the first audio channel. In step 612, the analyzed information may be stored so that it may be utilized to indicate when the first game sound on the first audio channel overwhelms and when the first game sound on the first audio channel no longer overwhelms the second game sound on the second audio channel, in a subsequent game play without the need to do a signal analysis on the audio information for the game.

Figure 7:
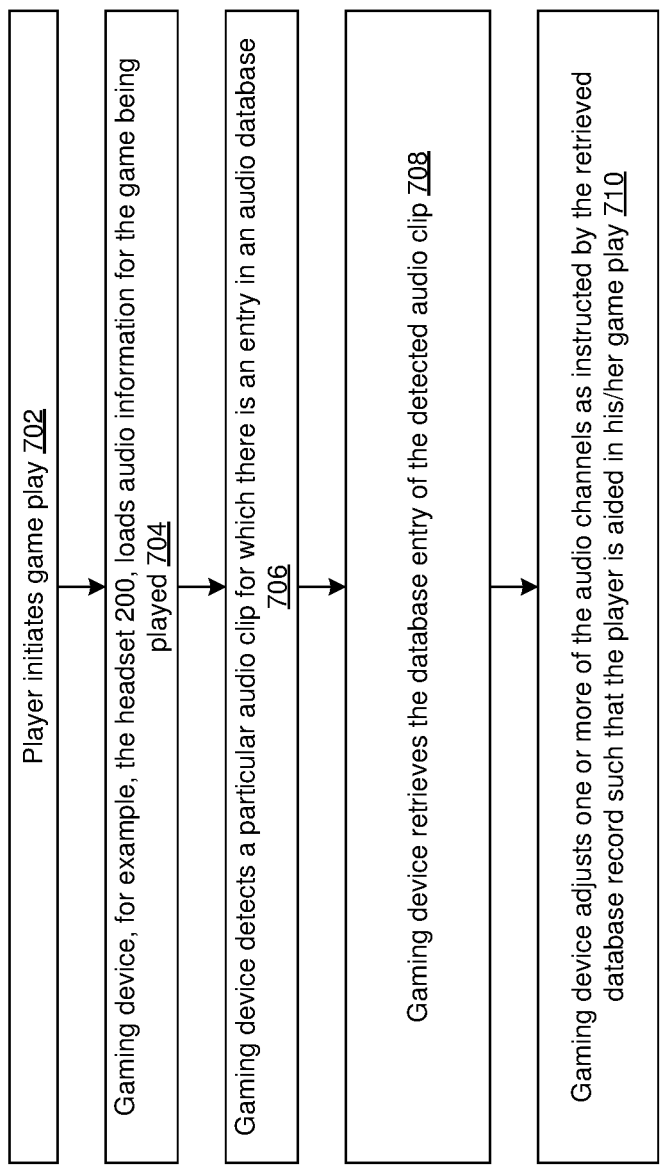
FIG. 7 is a flow diagram illustrating exemplary steps for dynamic control of game audio based on audio analysis, in accordance with various exemplary embodiments of the disclosure.

FIG. 7 is a flow diagram illustrating exemplary steps for dynamic control of game audio based on audio analysis, in accordance with various exemplary embodiments of the disclosure.

In block 702 the player initiates game play. For example, the player loads AdventureGame into his/her game console, powers on the game console, navigates through one or more menu/title screens, and then begins playing level 1 of AdventureGame.

In block 704, the gaming device (e.g., headset 200) loads audio information for the game being played. For example, the gaming device accesses database 182, retrieves a record corresponding to AdventureGame, and loads the record into memory 162. Each record may contain, for example, the audio signature of an audio clip and instructions on how to adjust audio levels when the audio clip is detected during gameplay.

In block 706, the gaming device detects the occurrence of an audio clip for which there is a record in the database 182. In block 708, the gaming device accesses the stored database record corresponding to the detected audio clip. In block 710, the gaming device adjusts the audio levels based on the information in the database record for the detected audio clip. For example, in AdventureGame two loud bangs of particular frequency content may be uniquely associated with a scenario in level one in which two barrels fall to the ground and then an enemy comes from behind the player's character in the next five seconds. Accordingly, the audio level commands in the database record for detected audio clip may cause the gaming device to decrease the volume on front and side channels and increase the volume on the back channels for five seconds such that the player more clearly hears the enemy approaching from behind.

In accordance with en exemplary embodiment of the disclosure, a gaming device such as the headset 200, during play of a particular game, may be operable to receive a plurality of audio channels carrying game sounds. The headset 200 may be operable to determine whether a first of the game sounds overwhelms a second of the game sounds. In response to the determination, the headset 200 may be operable to adjust a level of one or more of the audio channels such that perceptibility of the second game sound may be improved relative to perceptibility of the first game sound prior to the adjustment. In accordance with an embodiment of the disclosure, for the adjustment, the level of one or more of the audio channels carrying the first game sound may be decreased while a level of one or more of the audio channels carrying the second game sound may be maintained or increased. The audio channels may include three or more audio channels and the adjustment of the level of the audio channels may be performed while the three or more audio channels are combined into two stereo channels.

In accordance with an exemplary embodiment of the disclosure, in instances when the first game sound ceases to overwhelm the second game sound, the headset 200 may be operable to increase the level of the one or more audio channels that carries the first game sound while the level of the one or more audio channels carrying the second game sound may be maintained or decreased. The headset 200 may be operable to perform the determination dynamically based on signal analysis of the plurality of audio channels and/or acquired audio information for the particular game. The headset 200 may be operable to store the audio information for the particular game a first time the particular game is played on the headset 200.

The decreasing of the level of the one or more of the audio channels may comprise muting. The headset 200 may be operable to unmute the audio channel, which carries the first game sound when the first game sound ceases to overwhelm the second game sound. The headset 200 may also be operable to acquire the audio information for the particular game from a source within the headset 200 and/or from a source external to the headset 200. The audio information may be acquired when the play of the particular game is started on the headset 200. The audio channel that carries the first game sound may comprise a center audio channel.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
   receiving, via a headset, a plurality of channels comprising three or more channels, wherein each of the three or more channels are encoded as surround sound channels;
   determining, via the headset, that a first channel has a higher loudness relative to a second channel;
   in response to the determining, adjusting, via the headset, a power level of one or more of the plurality of channels such that loudness of the second channel, relative to the first channel, is increased; and
   combining the plurality of channels into two stereo channels.

2. The method according to claim 1, wherein the plurality of channels are surround sound channels.

3. The method according to claim 1, comprising:
   detecting when the first channel ceases to be too loud relative to the second channel; and
   in response to the detecting, adjusting the power level of the one or more of the plurality of channels.

4. The method according to claim 1, wherein the determining occurs dynamically according to acquired audio information for a particular game.

5. The method according to claim 1, comprising storing, via the headset, audio information for a particular game a first time the particular game is played on a gaming device.

6. The method according to claim 1, wherein the adjusting comprises muting one of the plurality of channels.

7. The method according to claim 1, comprising unmuting one of the plurality of channels when the first channel ceases to be too loud relative to the second channel.

8. The method according to claim 1, comprising acquiring audio information for a particular game from a source external to the headset.

9. The method according to claim 1, wherein audio information is acquired when a particular game is started.

10. The method according to claim 1, wherein the plurality of channels comprises center, front left, and front right channels.

11. A system, comprising:
    a headset operable to:
    receive a plurality of channels comprising three or more channels, wherein each of the three or more channels are encoded as surround sound channels;
    determine that a first channel has a higher loudness relative to a second channel;
    in response to the determination, adjust a power level of one or more of the plurality of channels such that loudness of the second channel relative to the first channel is increased; and
    combine the plurality of channels into two stereo channels.

12. The system according to claim 11, wherein the plurality of channels are surround sound channels.

13. The system according to claim 11, wherein the headset is operable to:
    detect when the first channel ceases to be too loud relative to the second channel; and
    in response to the detection, adjust the power level of the one or more of the plurality of channels.

14. The system according to claim 11, wherein the determination occurs dynamically according to acquired audio information for a particular game.

15. The system according to claim 11, wherein the headset is operable to store audio information for a particular game a first time the particular game is played on a gaming device.

16. The system according to claim 11, wherein the adjustment comprises muting one or more of the plurality of channels.

17. The system according to claim 11, wherein the headset is operable to unmute the first channel when the first channel ceases to be too loud relative to the second channel.

18. The system according to claim 11, wherein the headset is operable to acquire audio information for a particular game from a source external to the headset.

19. The system according to claim 11, wherein audio information is acquired when a particular game is started.

20. The system according to claim 11, wherein the plurality of channels comprises center, front left, and front right audio channels.

* * * * *